(12) United States Patent
Donaldson et al.

(10) Patent No.: US 9,694,574 B2
(45) Date of Patent: Jul. 4, 2017

(54) SYSTEM FOR DETECTING INOPERATIVE INKJETS IN PRINTHEADS EJECTING CLEAR INK USING THERMAL SUBSTRATES

(71) Applicant: Xerox Corporation, Norwalk, CT (US)

(72) Inventors: Patricia J. Donaldson, Pittsford, NY (US); William H. Wayman, Ontario, NY (US)

(73) Assignee: Xerox Corporation, Norwalk, CT (US)

( * ) Notice: Subject to any disclaimer, the term of this patent is extended or adjusted under 35 U.S.C. 154(b) by 0 days.

(21) Appl. No.: 15/342,941

(22) Filed: Nov. 3, 2016

(65) Prior Publication Data

US 2017/0050430 A1 Feb. 23, 2017

Related U.S. Application Data

(60) Continuation of application No. 15/070,589, filed on Mar. 15, 2016, now Pat. No. 9,561,649, which is a continuation of application No. 14/817,530, filed on Aug. 4, 2015, now Pat. No. 9,358,820, which is a
(Continued)

(51) Int. Cl.
| | |
|---|---|
| *B41J 2/045* | (2006.01) |
| *B41J 2/21* | (2006.01) |
| *B41J 29/393* | (2006.01) |
| *B29C 67/00* | (2017.01) |
| *B41J 2/125* | (2006.01) |
| *B41J 2/14* | (2006.01) |
| *B33Y 50/02* | (2015.01) |
| *B41J 2/165* | (2006.01) |

(Continued)

(52) U.S. Cl.
CPC ....... *B41J 2/04535* (2013.01); *B29C 67/0059* (2013.01); *B29C 67/0088* (2013.01); *B33Y 50/02* (2014.12); *B41J 2/04585* (2013.01); *B41J 2/125* (2013.01); *B41J 2/14153* (2013.01); *B41J 2/16579* (2013.01); *B41J 2/21* (2013.01); *B41J 2/2107* (2013.01); *B41J 2/2114* (2013.01); *B41J 2/2142* (2013.01); *B41J 29/393* (2013.01); *B33Y 30/00* (2014.12); *B33Y 70/00* (2014.12); *B41J 2029/3935* (2013.01)

(58) Field of Classification Search
CPC .... B41J 2/04523; B41J 2/125; B41J 2/04535; B41J 2/14153; B41J 2/04585; B41J 2/2114; B41J 2/2142
See application file for complete search history.

(56) References Cited

U.S. PATENT DOCUMENTS

| | | | | |
|---|---|---|---|---|
| 5,640,180 | A | * | 6/1997 | Hale ....................... B41F 16/02 347/103 |
| 2004/0012112 | A1 | | 1/2004 | Davidson et al. |
| 2006/0111807 | A1 | | 5/2006 | Gothait et al. |

(Continued)

FOREIGN PATENT DOCUMENTS

WO 03/026876 A2 4/2003

*Primary Examiner* — Jason Uhlenhake
(74) *Attorney, Agent, or Firm* — Maginot Moore & Beck LLP

(57) ABSTRACT

An apparatus detects inoperative inkjets during printing. The apparatus operates the printhead or printheads in the printer to form test pattern on a thermal substrate. The heat of the materials used to form the test pattern increase the optical density of the areas where the materials land. The area where the test pattern is formed is imaged and the image data are analyzed to identify inoperative inkjets.

19 Claims, 7 Drawing Sheets

Related U.S. Application Data division of application No. 14/231,374, filed on Mar. 31, 2014, now Pat. No. 9,162,509.

(51) Int. Cl.
*B33Y 30/00* (2015.01)
*B33Y 70/00* (2015.01)

(56) References Cited

U.S. PATENT DOCUMENTS

| | | |
|---|---|---|
| 2006/0141145 A1 | 6/2006 | Davidson et al. |
| 2009/0011066 A1 | 1/2009 | Davidson et al. |
| 2009/0085944 A1 | 4/2009 | Keeton et al. |
| 2010/0151136 A1 | 6/2010 | Davidson et al. |
| 2011/0032301 A1* | 2/2011 | Fienup ............... B29C 67/0059 347/19 |
| 2012/0056966 A1* | 3/2012 | Maruyama ............... B41J 15/02 347/221 |
| 2012/0300006 A1* | 11/2012 | Mealy ....................... B41J 3/36 347/109 |
| 2013/0057611 A1* | 3/2013 | Wu ....................... B41J 2/2139 347/19 |

\* cited by examiner

SYSTEM FOR DETECTING INOPERATIVE INKJETS IN PRINTHEADS EJECTING CLEAR INK USING THERMAL SUBSTRATES

PRIORITY CLAIM

This application is a continuation application of and claims priority to U.S. patent application Ser. No. 15/070,589, which is entitled "System For Detecting Inoperative Inkjets In Printheads Ejecting Clear Ink Using Thermal Substrates," which was filed on Mar. 15, 2016 and issued as U.S. Pat. No. 9,561,649 on Feb. 7, 2017, and which claimed priority from U.S. patent application Ser. No. 14/817,530, which is entitled "System For Detecting Inoperative Inkjets In Printheads Ejecting Clear Ink Using Thermal Substrates," which was filed on Aug. 4, 2015 and issued as U.S. Pat. No. 9,358,820 on Jun. 7, 2016 and which claimed priority from U.S. patent application Ser. No. 14/231,374, which is entitled "System For Detecting Inoperative Inkjets In Printheads Ejecting Clear Ink Using Thermal Substrates," which was filed on Mar. 31, 2014, and which issued as U.S. Pat. No. 9,162,509 on Oct. 20, 2015.

TECHNICAL FIELD

The device disclosed in this document relates to printers that detect inoperative inkjets in printheads and, more particularly, to accurate detection of inoperative inkjets in printers that use clear inks.

BACKGROUND

Printing of documents on substrates, such as paper, are well-known. Newer forms of printing now include digital three-dimensional manufacturing, also known as digital additive manufacturing. This type of printing is a process of making a three-dimensional solid object of virtually any shape from a digital model. Three-dimensional printing is an additive process in which one or more printheads eject successive layers of material on a substrate in different shapes. Three-dimensional printing is distinguishable from traditional object-forming techniques, which mostly rely on the removal of material from a work piece by a subtractive process, such as cutting or drilling.

The production of a three-dimensional object with these printers can require hours or, with some objects, even days. One issue that arises in the production of three-dimensional objects with a three-dimensional printer is consistent functionality of the inkjets in the printheads that eject the drops of material that form the objects. During printing of an object, one or more inkjets can deteriorate by ejecting the material at an angle, rather than normal, to the printhead, ejecting drops that are smaller than an inkjet should eject, or by failing to eject any drop at all. An inkjet suffering from any of these operational deficiencies is known as an inoperative inkjet Similar maladies in printheads are known in document printing with printheads. If the operational status of one or more inkjets deteriorates during three-dimensional object printing, the quality of the printed object cannot be assessed until the printing operation is completed. Consequently, print jobs requiring many hours or multiple days can produce objects that do not conform to specifications due to inoperative inkjets in the printheads. Once such objects are detected, the printed objects are scrapped, restorative procedures are applied to the printheads to restore inkjet functionality, and the print job is repeated. Even in document printing at high speeds on a moving web, unacceptable images may be produced over a long length of the web and this portion of the web may have to be scrapped.

Although systems have been developed in document printing systems to detect inoperative inkjets, the detection of inoperative inkjets in object printing systems is more problematic. Particularly problematic in both object printing and document printing systems are the use of the clear materials and inks. These materials and inks are difficult to detect by imaging systems because the contrast between the clear inks/materials on the substrates on which they are ejected is low. Consequently, the noise in the image data of the patterns on the substrate makes analysis of the test pattern difficult. An apparatus that enables detection of inoperative inkjets while printing with clear ink or clear materials would enable restorative procedures to be applied during object printing so printing that can produce a properly formed object or document could continue. In this manner, product yield for the printer is improved and its printing is more efficient.

SUMMARY

An apparatus that enables inoperative inkjet detection in three-dimensional printers includes a supply of thermal substrate, an optical sensor configured to generate electrical signals data corresponding to an area of material drops on the substrate, an actuator operatively connected to the optical sensor to move the optical sensor to a position opposite the thermal substrate onto which material has been ejected, and a controller operatively connected to the actuator, the optical sensor, and the printhead, the controller being configured to operate the printhead to eject a predetermined number of material drops from each inkjet onto the thermal substrate to enable the predetermined number of material drops to form a test dot for each inkjet on the thermal substrate, to operate the actuator to the optical sensor to a position opposite the thermal substrate, and to identify inoperative inkjets in the printhead with reference to the data received from the optical sensor that corresponds to optical densities of the thermal substrate at a plurality of locations on the thermal substrate.

A printer that incorporates the apparatus for detecting inoperative inkjets includes a printhead configured with a plurality of inkjets to eject material, a supply of thermal substrate configured to move thermal substrate to a position opposite the printhead to receive material ejected from the printhead, an optical sensor configured to generate electrical signals corresponding to an optical density of a location on the thermal substrate, an actuator operatively connected to the optical sensor to move the optical sensor to a position opposite the thermal substrate onto which material has been ejected, and a controller operatively connected to the actuator, the optical sensor, and the printhead, the controller being configured to operate the printhead to eject a predetermined number of material drops from each inkjet onto the thermal substrate to enable the predetermined number of material drops to form a test dot for each inkjet on the thermal substrate, to operate the actuator to the optical sensor to a position opposite the thermal substrate, and to identify inoperative inkjets in the printhead with reference to the data received from the optical sensor that corresponds to optical densities of the thermal substrate at a plurality of locations on the thermal substrate.

BRIEF DESCRIPTION OF THE DRAWINGS

The foregoing aspects and other features of an apparatus or printer that detects inoperative inkjets during three-dimensional printing are explained in the following description, taken in connection with the accompanying drawings.

DETAILED DESCRIPTION

Figure 1:
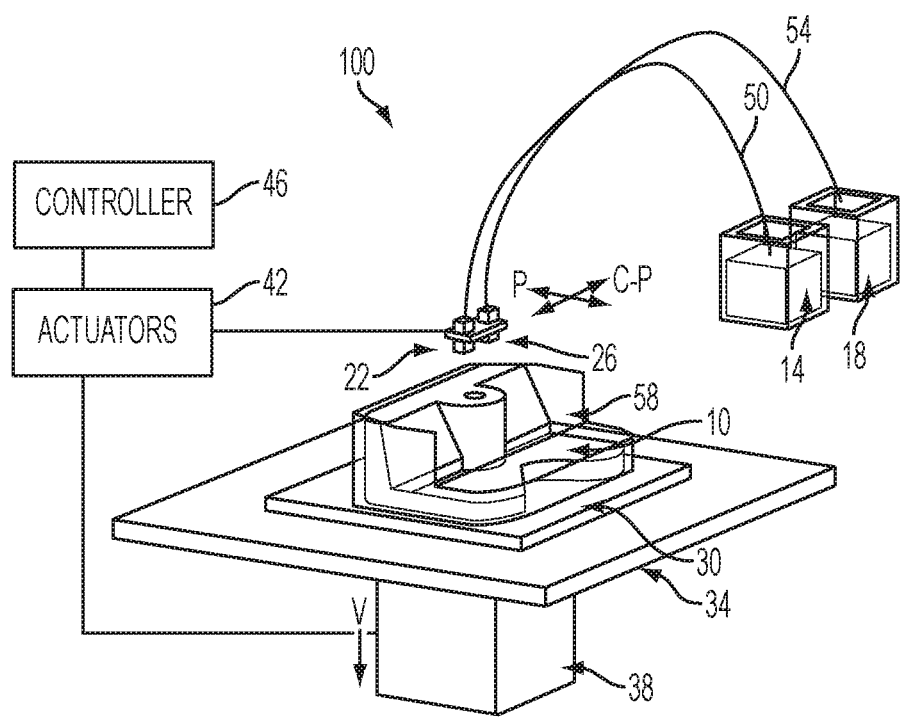
FIG. 1 is a perspective view of a three-dimensional object printer.

For a general understanding of the environment for the device disclosed herein as well as the details for the device, reference is made to the drawings. In the drawings, like reference numerals designate like elements.

FIG. 1 shows a configuration of components in a printer 100, which produces a three-dimensional object or part 10. As used in this document, the term "three-dimensional printer" refers to any device that ejects material with reference to image data of an object to form a three-dimensional object. The printer 100 includes a support material reservoir 14, a build material reservoir 18, a pair of inkjet printheads 22, 26, a build substrate 30, a planar support member 34, a columnar support member 38, an actuator 42, and a controller 46. Conduit 50 connects printhead 22 to support material reservoir 14 and conduit 54 connects printhead 26 to build material reservoir 18. Both inkjet printheads are operated by the controller 46 with reference to three-dimensional image data in a memory operatively connected to the controller to eject the support and build materials supplied to each respective printhead. The build material forms the structure of the part 10 being produced, while the support structure 58 formed by the support material enables the build material to maintain its shape while the material solidifies as the part is being constructed. The support material also allows the build material to bridge gaps in the underlying object. After the part is finished, the support structure 58 is removed by washing, blowing, or melting.

The controller 46 is also operatively connected to at least one and possibly more actuators 42 to control movement of the planar support member 34, the columnar support member 38, and the printheads 22, 26 relative to one another. That is, one or more actuators can be operatively connected to structure supporting the printheads to move the printheads in a process direction and a cross-process direction with reference to the surface of the planar support member. Alternatively, one or more actuators can be operatively connected to the planar support member 34 to move the surface on which the part is being produced in the process and cross-process directions in the plane of the planar support member 34. As used herein, the term "process direction" refers to movement along one axis in the surface of the planar support member 34 and "cross-process direction" refers to movement along an axis in the planar support member surface that is orthogonal to the process direction axis in that surface. These directions are denoted with the letters "P" and "C-P" in FIG. 1. The printheads 22, 26 and the columnar support member 38 also move in a direction that is orthogonal to the planar support member 34. This direction is called the vertical direction in this document, is parallel to the columnar support member 38, and is denoted with the letter "V" in FIG. 1. Movement in the vertical direction is achieved with one or more actuators operatively connected to the columnar member 38, by one or more actuators operatively connected to the printheads 22, 26, or by one or more actuators operatively connected to both the columnar support member 38 and the printheads 22, 26. These actuators in these various configurations are operatively connected to the controller 46, which operates the actuators to move the columnar member 38, the printheads 22, 26, or both in the vertical direction.

Figure 2:
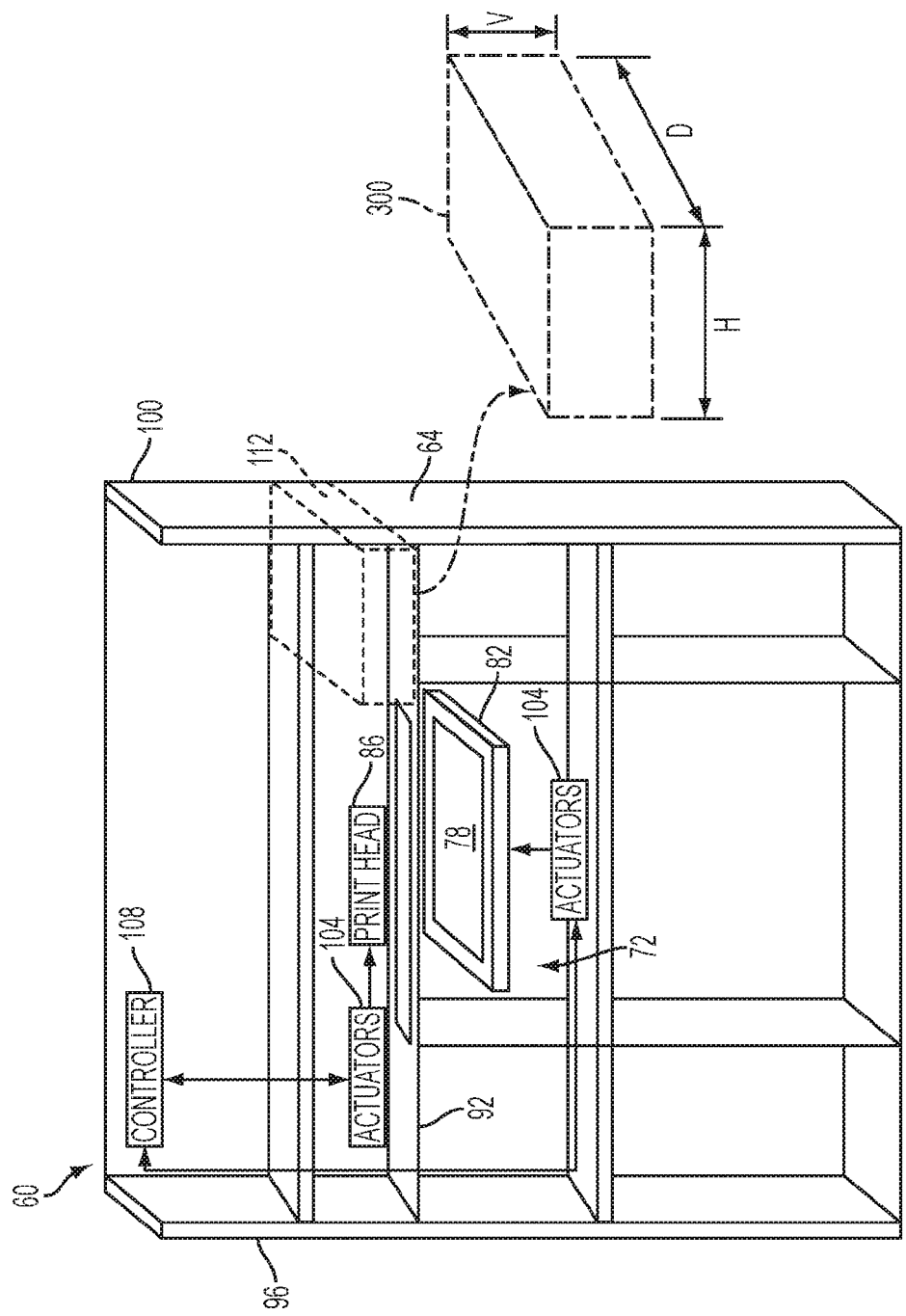
FIG. 2 is front view of a three-dimensional object printer having a housing that depicts a space within the housing for a module that enables inoperative inkjets in the printhead to be detected during a printing operation.

A three-dimensional object printer having a housing is shown in FIG. 2. Printer 60 has a housing 64 that is mounted to a frame 68. Within the housing 64 are six compartments that are generally cubic in shape. The housing 64 is shown in FIG. 2 without the doors that close to conceal the compartments. Compartment 72 includes a planar support 78 on a movable platform 82. Movable platform 82 is configured with one or more actuators and guide members (not shown) to enable the movable platform 82 to move up and down in a vertical direction. The planar support 78 is the surface on which a three-dimensional object is formed. In some embodiments, the printhead 86 has a length that is approximately equal to the length of the planar support 78 in the direction from the back wall of compartment 72 to the opening at the front of the compartment. In these embodiments, printhead 86 is mounted on support member 92 in the space between sidewalls 96 and 100 of housing 64 for linear reciprocating movement only. In other embodiments, the printhead 86 has a length that is less than the length of the planar support 78 in the direction from the back wall of compartment 72 to the opening at the front of the compartment. In these embodiments, printhead 86 is mounted on support member 92 in the space between sidewalls 96 and 100 of housing 64 for reciprocating movement in two orthogonal directions in a plane above compartment 72. In these various embodiments, one or more actuators 104 are operatively connected to the printhead 86. Controller 108 operates the actuators 104 to move the printhead 86 either linearly back and forth on support member 92 or to move the printhead in two orthogonal directions within a plane. By selectively operating the inkjets in the printhead 86 and vertically moving the support platform 82 and horizontally moving the printhead 86 on the member 92, a three-dimensional object can be formed on the planar support 78.

The area 112 outlined in dashes in FIG. 2 identifies the placement of a module that prints a test pattern on thermal substrates to detect inoperative inkjets in the printer 60. As noted above, if an inkjet fails during printing of an object by either completely or partially failing to eject material or by errantly ejecting material in a skewed direction, the object being produced is malformed. Currently, this malformation cannot be detected until production of the object is finished. By using area 112 for optically sensing material ejected onto a thermal substrate, printer 60 can be configured to detect inoperative inkjets during object production as described more fully below. Some components within the module 300 can move in the horizontal direction H, depth direction D, and vertical direction V as shown in the figure.

Figure 3:
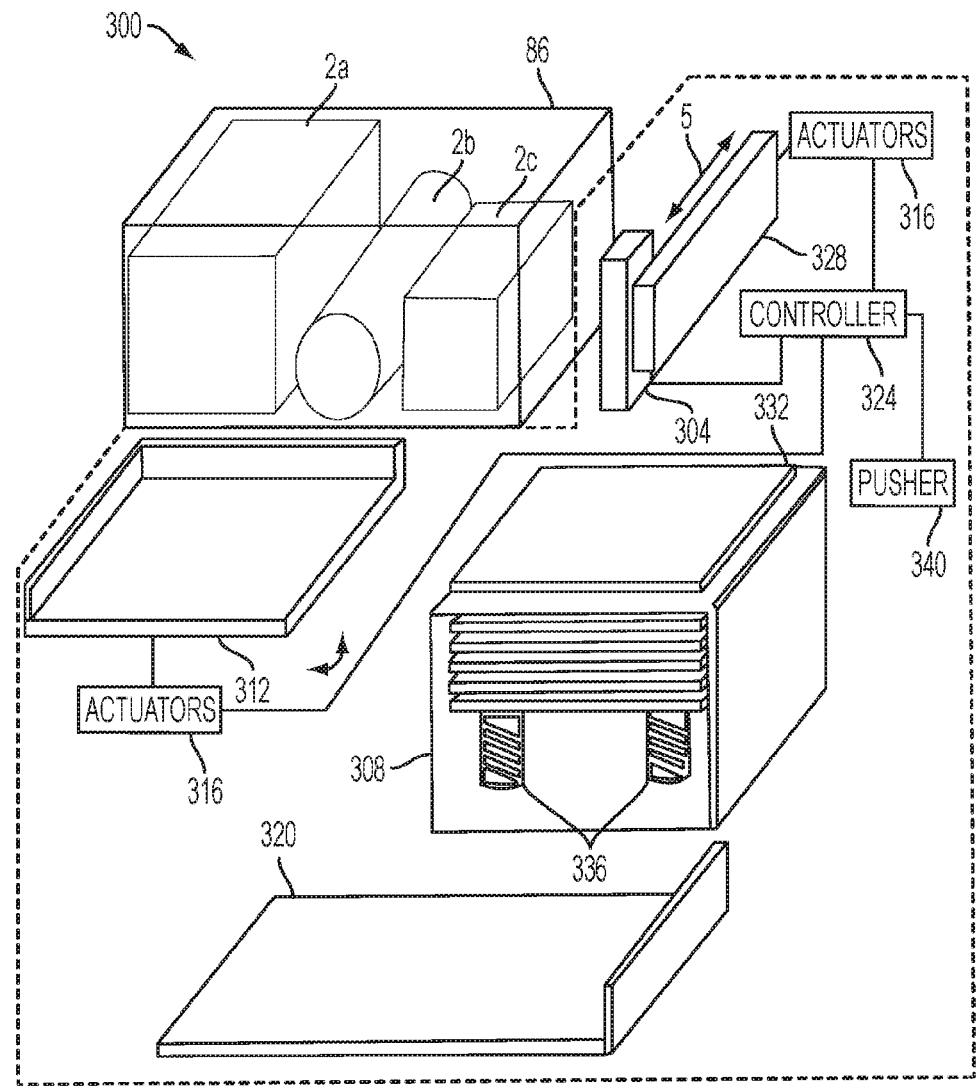
FIG. 3 is a perspective view of a module for detecting inoperative inkjets that fits in the space shown in FIG. 2.

One embodiment of a module that detects inoperative inkjets during object printing is shown in the block diagram of FIG. 3. While the module 300 is described as being installed in a printer that produces three-dimensional objects, it can also be used in printers that eject inks to produce printed documents, particularly those that use one or more types of clear ink. The module 300 is configured to fit within area 112 of printer 60. The module 300 includes an optical sensor 304, a thermal substrate supply 308, a support member 312, one or more actuators 316, a collection tray 320, and a controller 324. The optical sensor 304 is mounted for movement along guide rail 328 and the guide rail 328 is operatively connected to an actuator 316 to move the optical sensor 304 from a position over the substrate supply 308 to a position over the support member 312 and back again. The controller 324 is operatively connected to the actuators 316 to move the optical sensor 304 and guide rail as described, to displace a thermal substrate 332 from the supply 308 to the support member 312, and to pivot the support member 312 to drop a thermal substrate from the support member 312 into the collection tray 320. Alternatively, the guide rail 328 and the optical sensor 304 can be fixedly mounted to the printhead 86 so controller 108 can operate actuators 104 to move the printhead and the sensor 304. Alternatively, the optical sensor can be fixedly mounted over the collection tray 320, in a manner that enables the sensor to scan the paper as it is fed into the tray. As shown in the figure, printhead 86 can include an ejector head 2a, a curing device 2b, and a planarizer 2c, although the curing device 2b and planarizer 2c are not needed for materials that do not require curing or trimming.

Figure 7:
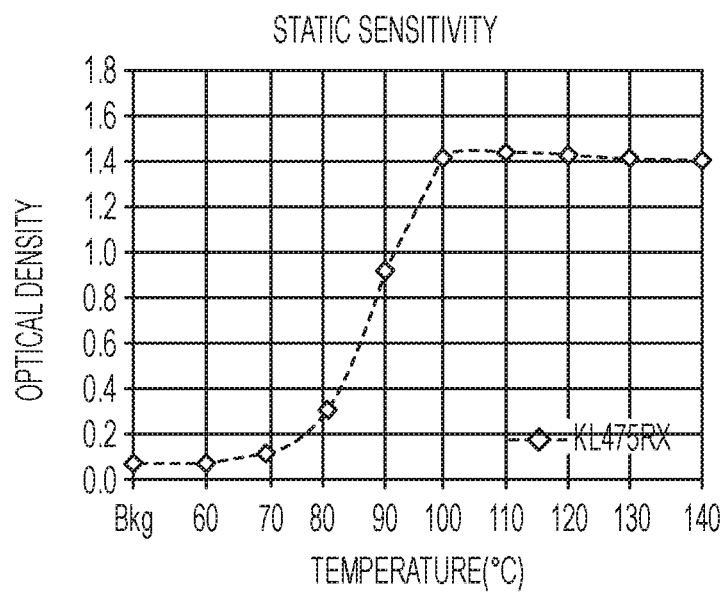
FIG. 7 is a static sensitivity graph for an exemplary thermal substrate used in the systems of FIG. 3 and FIG. 5.
Figure 8:
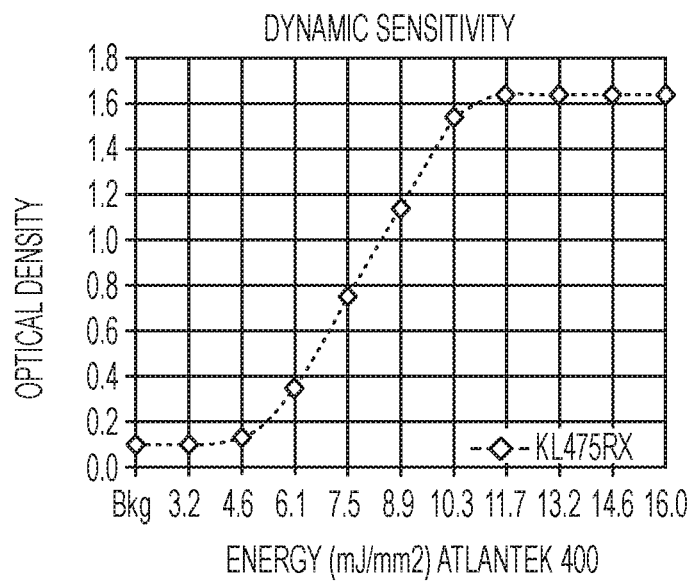
FIG. 8 is a dynamic sensitivity graph for the exemplary thermal substrate described in the graph of FIG. 6.

The thermal substrates 332 in the substrate supply 308 are planar members made of a substance that supports the build material and the support material ejected from the printhead 86, such as paper, which is coated with a heat sensitive dye that changes color in response to exposure to heat contained within the build material or support material. These dyes increase in optical density with reference to a known function of optical density per unit of heat energy input to the substance of the thermal substrate. FIG. 7 shows a static sensitivity curve for KL475RX paper made by Kanzaki Specialty Papers, Inc. of Springfield, Mass. This curve graphs optical density of the paper versus temperature and it indicates that the paper changes optical density in a temperature range centered about 90 degrees C. This paper would therefore be a good choice for detecting clear ink jetted at 90 C, which is a typical material temperature for three-dimensional printing. FIG. 8 shows a dynamic sensitivity range graph, which gives the optical density response as a function of input energy, for the KL475RX paper. This graph is important for applications in which the material drops cool quickly after ejection from the printhead. These drops may be at high temperature for a relatively short time before cooling below the sensitivity threshold of the paper. Kanzaki KL475RX has a nearly linear response to input energy, which is useful for quantifying the amount of heat that needs to be delivered to the paper to produce the optical density change.

The substrate supply 308 includes a lifting mechanism 336 that lifts the thermal substrates 332 as a pushing mechanism 340 removes a single substrate from the supply and positions it onto the support member 312. The lifting mechanism 336 can be a spring-loaded mechanism, an air spring, a mechanically actuated jack, or the like. The pushing mechanism 340 can be a solenoid or the like. The guide rail that supports the optical sensor 304 is operatively connected to one of the actuators 316 to move the guide rail 328 and the optical sensor 304 between the position over the substrate supply 308 and the position over the support member 312 in a reciprocating manner between the two positions. When the guide rail 328 and the sensor 304 are over the substrate supply 308, the printhead 86 can be moved above a thermal substrate 332 on the support member 312 to enable printing of a test pattern on the substrate. The heat energy of the build material and support material on the substrate increases the optical density of the thermal substrate at the point of impact and the immediately surrounding area. The extent of the optical density spread corresponds to the amount of heat energy carried by the material mass ejected by the inkjets. When the guide rail 328 and the sensor 304 are over the support member 312, the sensor 304 is moved along the guide rail 328 to enable generation of image data of the test pattern on the thermal substrate 332.

Figure 4:
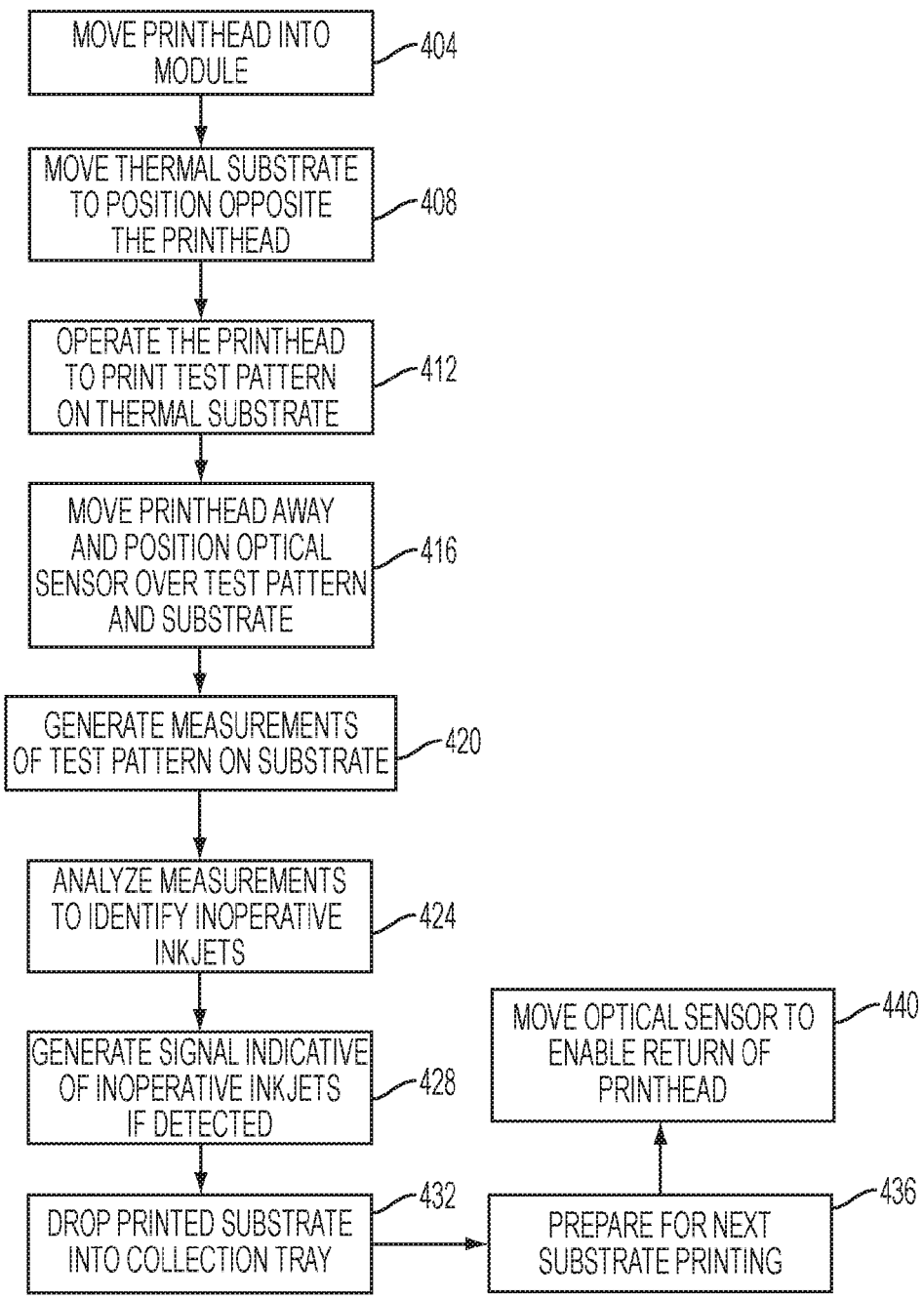
FIG. 4 is a flow diagram of a method for operating the module of FIG. 3.

A method of operating a printer that produces three-dimensional objects is shown in FIG. 4. In the description of this method, statements that a process is performing some task or function refers to a controller or general purpose processor executing programmed instructions stored in a memory operatively connected to the controller or processor to manipulate data or to operate one or more components in the printer to perform the task or function. The controller 324 noted above can be such a controller or processor. Alternatively, the controller 324 can be implemented with more than one processor and associated circuitry and components, each of which is configured to form one or more tasks or functions described herein.

At predetermined times in the printing operation, the controller 108 (FIG. 2) operates an actuator 104 to move the printhead 86 into the module 300 located in the area 112 (block 404). In response to the controller 324 detecting the printhead in the module 300, controller 324 operates the pushing mechanism 340 to move a thermal substrate 332 onto the support member 312 (block 408). Controller 324 then generates a signal to the controller 108 to operate the inkjets in the printhead to print a test pattern on the thermal substrate (block 412). In one embodiment, each inkjet in the printhead is repetitively operated to form a pile of material, also called a test dot, on a portion of the thermal substrate 332 opposite the inkjet. After the test pattern is printed, controller 108 moves the printhead 86 out of the module 300 and generates a signal for controller 324. In response to the signal from controller 108, controller 324 operates an actuator 316 to move the guide rail 328 and the optical sensor 304 to a position opposite the test pattern on the thermal substrate 332 (block 416). The optical sensor 304 is then moved along the guide rail 328 to emit a light towards the test pattern on the substrate 332, receive the reflections from the test pattern and thermal substrate, and generate measurements of the test pattern on the thermal substrate 332 (block 420). The reflected light from the areas where the thermal energy has increased the optical density of the thermal substrate are substantially different from those where the optical density is unaffected. These measurements are analyzed with reference to the function relating optical density to the heat energy of each drop ejected onto the thermal substrate to identify inoperative inkjets (block 424) and, if inoperative inkjets are identified, a signal indicative of the defective printhead is generated for the operator of the printer (block 428). The operator can then take appropriate action. The process continues by the controller 324 operating an actuator 316 to rotate the support member 312 about one end of the member to enable the substrate on which the test pattern was printed to drop into the collection tray 320 (block 432). The actuator operation is then reversed to return the support member 312 to the position for receiving the next thermal substrate 332 (block 436). By operating another actuator 316, the controller 324 returns the guide rail 328 and the optical sensor 304 to the position over the substrate supply 308 (block 440).

Figure 5:
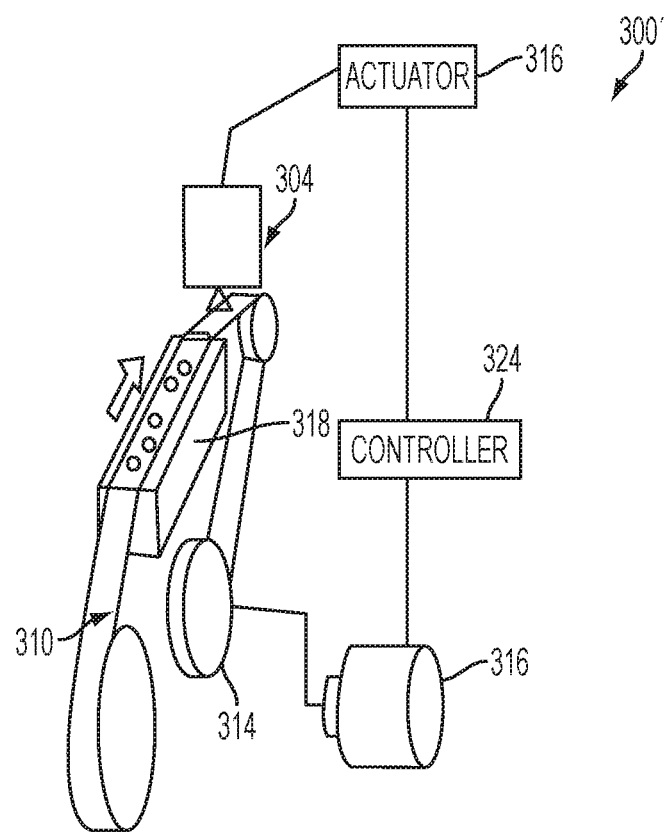
FIG. 5 is an alternative embodiment of a printer having a module for detecting inoperative inkjets during printing of a three-dimensional object.

In another embodiment shown in FIG. 5, the module 300' is formed with a roller supporting a supply of thermal substrate for the printing of test patterns that are moved to a take-up roller. The module 300' is also configured to fit within area 112 of printer 60. Using like numbers for like components, the module 300' includes an optical sensor 304, a supply roll 310 of thermal substrate on a roller, a take-up roller 314, one or more actuators 316, a pair of support members 318, and a controller 324. The optical sensor 304 is positioned to image the test pattern on the substrate pulled from supply 310 after printhead 86 has printed the test pattern on the substrate. The controller 324 is operatively connected to the actuator 316 to drive the take-up roller 314 and pull substrate from the supply roll 310. Alternatively, the optical sensor can be fixedly mounted within the module, so the sensor does not physically interfere with the printhead. The thermal substrate on the roll 310 can be made of a material that supports the build material and the support material ejected from the printhead 86 and that changes optical density in response to heat energy. For example, the thermal substrate roll could be a roll of the thermal paper available from Kanzaki Specialty Papers, Inc. noted above.

Figure 6:
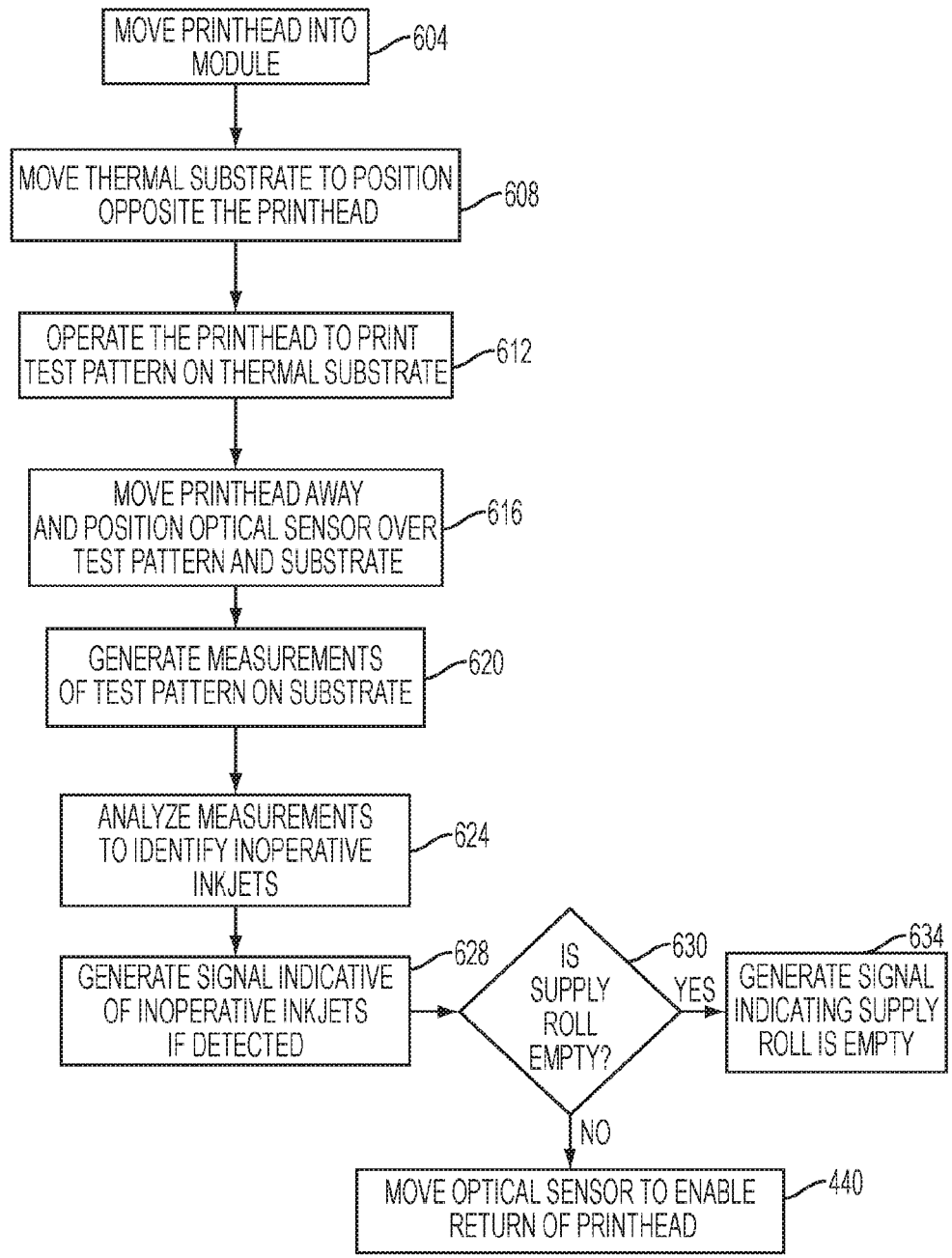
FIG. 6 is a flow diagram of a method for operating the module of FIG. 5.

A method of operating a printer that produces three-dimensional objects is shown in FIG. 6. In the description of this method, statements that a process is performing some task or function refers to a controller or general purpose processor executing programmed instructions stored in a memory operatively connected to the controller or processor to manipulate data or to operate one or more components in the printer to perform the task or function. The controller 324 noted above can be such a controller or processor. Alternatively, the controller 324 can be implemented with more than one processor and associated circuitry and components, each of which is configured to form one or more tasks or functions described herein.

At predetermined times in the printing operation, the controller 108 (FIG. 2) operates an actuator 104 to move the printhead 86 into the module 300 located in the area 112 (block 604). In response to the controller 324 detecting the printhead in the module 300, controller 324 operates an actuator 316 to rotate take-up roller 314 and pull a clean portion of the thermal substrate from the supply on the roll 310 to a position beneath the printhead 86 (block 608). Controller 324 then generates a signal to the controller 108 to operate the inkjets in the printhead to print a test pattern on the substrate (block 612). In one embodiment, each inkjet in the printhead is repetitively operated to form a pile of material, also called a test dot, on a portion of the substrate roll 310 opposite the inkjet. As noted above, the optical density in the areas of the substrate that absorb the heat of the ejected material changes. After the test pattern is printed, controller 108 moves the printhead 86 out of the module 300' and generates a signal for controller 324. In response to the signal from controller 108, controller 324 operates the actuator 316 to move the printed portion of the thermal substrate to a position opposite the optical sensor 304 (block 616). The optical sensor 304 is operated to emit a light towards the test pattern on the portion of the printed thermal substrate, receive the reflections from the test pattern and thermal substrate, and generate electrical signals corresponding to the optical densities of the test pattern on the thermal substrate (block 620). These electrical signals are image data that are analyzed with reference to the function relating optical density to the heat energy of each drop ejected onto the substrate to identify inoperative inkjets (block 624) and, if inoperative inkjets are identified, a signal indicative of the defective printhead is generated for the operator of the printer (block 628). The operator can then take appropriate action. The controller 324 determines if the supply roll 310 is empty (block 630), and if it is, generates a signal that indicates another supply roll is needed (block 634). An operator can then remove the take-up roll and provide another supply roll 310 of thermal substrate. If an adequate supply of thermal substrate remains, the controller 324 waits for the printhead to return to the position for printing another test pattern (block 604).

While the embodiments discussed above are within a printer that forms three-dimensional objects, thermal substrates and the system that detects inoperative inkjets from the changes in optical density on such substrates can be used in two dimensional document printing systems, particularly those that use clear inks. Thus, as used in this document, the word "material" refers to substances that can be used to form three dimensional objects as well as inks used in document printing. In such systems, a second supply of thermal substrates can be maintained and, from time to time, printed with a test pattern that is analyzed to identify inoperative inkjets. Likewise, printheads ejecting clear ink onto a moving web or an imaging member, such as a drum, can be moved opposite a thermal substrate, either in sheet form or from a roll supply, for printing and detection of inoperative inkjets.

It will be appreciated that variants of the above-disclosed and other features and functions, or alternatives thereof, may be desirably combined into many other different systems, applications or methods. Various presently unforeseen or unanticipated alternatives, modifications, variations or improvements may be subsequently made by those skilled in the art that are also intended to be encompassed by the following claims.

What is claimed:

1. A printer comprising:
    a printhead configured with a plurality of inkjets to eject material;
    a supply of thermal substrate having a surface that is coated with a heat sensitive dye that increases in optical density in response to heat contained within the material ejected from the printhead onto the thermal substrate, the optical density increase occurring with reference to a known function of optical density per unit of heat energy input to the heat sensitive dye on the thermal substrate;
    an optical sensor configured to generate electrical signals corresponding to optical densities at a plurality of locations on the thermal substrate;
    an actuator operatively connected to the optical sensor to move the optical sensor to a position opposite the thermal substrate onto which material has been ejected; and
    a controller operatively connected to the actuator, the optical sensor, and the printhead, the controller being configured to operate the printhead to eject a predetermined number of material drops from each inkjet onto the surface of the thermal substrate having the heat sensitive dye to enable the predetermined number of material drops to form a test dot for each inkjet that ejected material onto the thermal substrate and increase the optical density at each location in the plurality of locations on the thermal substrate at which each test dot was formed, to operate the actuator to move the optical sensor to a position opposite the thermal substrate, and to identify inoperative inkjets in the printhead with reference to the data received from the optical sensor that corresponds to the optical densities at the plurality of locations on the thermal substrate.

2. The printer of claim 1, the supply of thermal substrate further comprising:
   a plurality of thermal substrates, each substrate having the surface with the heat sensitive dye; and
   the controller is further configured to operate an actuator to move a single thermal substrate from the plurality of thermal substrates onto a support member at the position opposite the printhead.

3. The printer of claim 2 further comprising:
   a pivot for the support member to enable the support member to rotate;
   an actuator operatively connected to the support member and the controller; and
   the controller being further configured to operate the actuator to rotate the support member about the pivot to enable a thermal substrate to drop from the support member.

4. The printer of claim 3 further comprising:
   a collection tray positioned to receive thermal substrates dropping from the support member.

5. The printer of claim 4 wherein the collection tray is configured for removal from and reinstallation in the printer to enable removal of the thermal substrates from the collection tray.

6. The printer of claim 1, the supply of thermal substrate further comprising:
   a first roller, the supply of thermal substrate having the surface with the heat sensitive dye being wound in a roll mounted about the first roller;
   a second roller to which a loose end of the supply of thermal substrate is attached to enable thermal substrate to be transferred from the first roller by rotation of the second roller;
   an actuator operatively connected to the second roller and the controller, the actuator being configured to rotate the second roller; and
   the controller being further configured to operate the actuator operatively connected to the second roller to rotate the second roller to pull thermal substrate from the supply of thermal substrate mounted about the first roller.

7. The printer of claim 6, the controller being further configured to detect the supply of thermal substrate mounted about the first roller being exhausted and to generate a signal indicative of the supply of thermal substrate being exhausted to enable the thermal substrate wound on the second roller to be removed and another supply of thermal substrate to be mounted about the first roller.

8. The printer of claim 1, the controller being further configured to operate the actuator to move the optical sensor away from the position opposite the thermal substrate.

9. The printer of claim 1, the controller being further configured to identify inkjets that do not eject material drops of a predetermined size with reference to the data corresponding to the optical densities of the thermal substrate.

10. The printer of claim 1 wherein the printhead is configured to eject drops of build material to form three-dimensional objects and to cause the thermal sensitive dye to increase optical density at locations on the surface of the thermal surface where the drops of build material land on the heat sensitive dye.

11. An apparatus comprising:
   a supply of thermal substrate having a surface that is coated with a heat sensitive dye that increases in optical density in response to heat contained within the material ejected from the printhead onto the thermal substrate, the optical density increase occurring with reference to a known function of optical density per unit of heat energy input to the heat sensitive dye on the thermal substrate;
   an optical sensor configured to generate electrical signals data corresponding to optical densities at a plurality of locations on the thermal substrate;
   an actuator operatively connected to the optical sensor to move the optical sensor to a position opposite the thermal substrate onto which material has been ejected; and
   a controller operatively connected to the actuator, the optical sensor, and the printhead, the controller being configured to operate the printhead to eject a predetermined number of material drops from each inkjet onto the surface of the thermal substrate having the heat sensitive dye to enable the predetermined number of material drops to form a test dot for each inkjet on the thermal substrate and increase an optical density at each location in the plurality of locations on the thermal substrate at which each test dot was formed, to operate the actuator to move the optical sensor to a position opposite the thermal substrate, and to identify inoperative inkjets in the printhead with reference to the data received from the optical sensor that corresponds to optical densities at the plurality of locations on the thermal substrate.

12. The apparatus of claim 11, the supply of thermal substrate further comprising:
   a plurality of thermal substrates, each thermal substrate having the surface with the heat sensitive dye; and
   the controller is further configured to operate an actuator to move a single thermal substrate from the plurality of thermal substrates onto a support member at the position opposite the printhead.

13. The apparatus of claim 12 further comprising:
   a pivot for the support member to enable the support member to rotate;
   an actuator operatively connected to the support member and the controller; and
   the controller being further configured to operate the actuator to rotate the support member about the pivot to enable a thermal substrate to drop from the support member.

14. The apparatus of claim 13 further comprising:
   a collection tray positioned to receive thermal substrates dropping from the support member.

15. The apparatus of claim 14 wherein the collection tray is configured for removal from and reinstallation in the printer to enable removal of the thermal substrates from the collection tray.

16. The apparatus of claim 11, the supply of thermal substrate further comprising:
   a first roller, the supply of thermal substrate having the surface with the heat sensitive dye being wound in a roll mounted about the first roller;
   a second roller to which a loose end of the supply of thermal substrate is attached to enable thermal substrate to be transferred from the first roller by rotation of the second roller;
   an actuator operatively connected to the second roller and the controller, the actuator being configured to rotate the second roller; and the controller being further configured to operate the actuator operatively connected to the second roller to rotate the second roller to pull thermal substrate from the supply of thermal substrate mounted about the first roller.

17. The apparatus of claim 16, the controller being further configured to detect the supply of thermal substrate mounted about the first roller being exhausted and to generate a signal indicative of the supply of thermal substrate being exhausted to enable the thermal substrate wound on the second roller to be removed and another supply of thermal substrate to be mounted about the first roller.

18. The apparatus of claim 11, the controller being further configured to operate the actuator to move the optical sensor away from the position opposite the thermal substrate.

19. The apparatus of claim 11, the controller being further configured to identify inkjets that do not eject material drops of a predetermined size with reference to the data corresponding to the optical densities of the thermal substrate.

* * * * *